April 28, 1959 G. GHEZZI 2,884,239
DEVICE FOR THE AUTOMATIC OPERATION OF WEIGHING BALANCES
Filed April 7, 1955
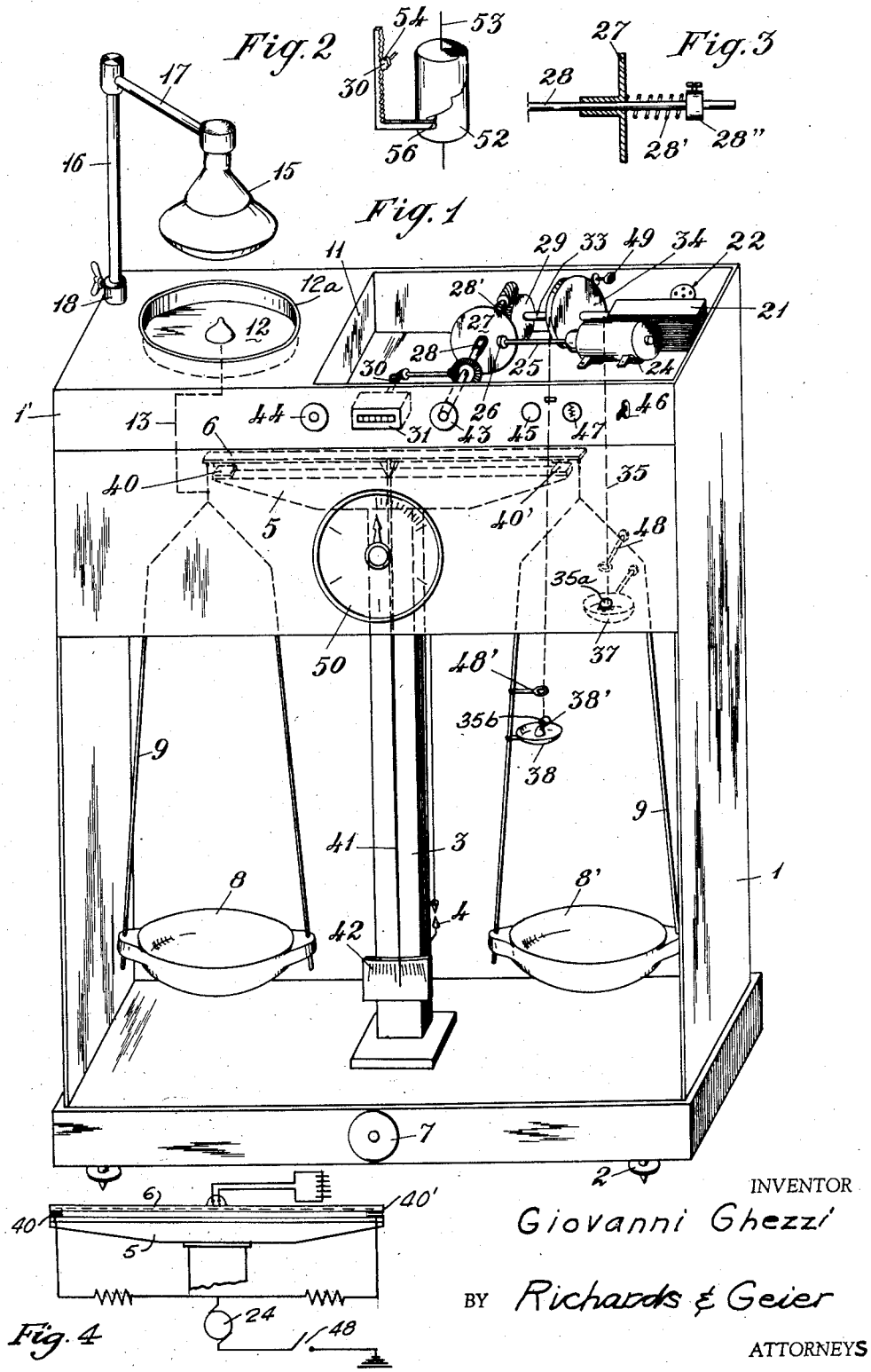
INVENTOR
Giovanni Ghezzi
BY Richards & Geier
ATTORNEYS

United States Patent Office 2,884,239
Patented Apr. 28, 1959

2,884,239

DEVICE FOR THE AUTOMATIC OPERATION OF WEIGHING BALANCES

Giovanni Ghezzi, Lecce, Italy

Application April 7, 1955, Serial No. 500,000

Claims priority, application Italy April 10, 1954

2 Claims. (Cl. 265—70)

The subject of the present invention is a device intended to render automatic the operation of any technical or analytical balance, including the highly sensitive type. Automatic operation means that a reading can be taken directly on a meter, and without the operator's intervention, of a number indicating the units and fractions of unit of weight of the substance weighed, and the variations, even in percentage, undergone by the weight of a substance under certain circumstances, for instance through drying or absorption of moisture from the atmosphere.

The invention is based upon the following principle: the unbalance caused on the balance beam as a result of insufficient or excessive weight on either balance pan is compensated by a certain length of calibrated chain which a calibrated wheel transfers from a fixed pan to a pan fitted to the balance beam or vice versa. The length of chain passing over the calibrated wheel is registered by a revolution counter in terms of the weight of the chain transferred. In the device, the registration and the compensation of weight differences are affected automatically by means of a system of electrical contacts which actuate a small motor. When the equilibrium of the two pans is reached, the motor is stopped.

The degree of precision that can be obtained with the device covered by the present invention varies depending on the characteristics of the balance and on the length of the chain per unit of weight. In practice, weight approximations of less than 1/100 of gram are easily obtained, which are adequate for all laboratory technical and analytical weighing operations.

This device renders possible many operations which are not permitted by other known automatic balances, and which would require separate instruments and apparatuses. Among other operations the device makes it possible to:

(a) Weigh small quantities, for instance up to 10 grams, without requiring special attention, in a fully automatic fashion;

(b) Weigh objects up to the maximum capacity of the balance. The operator merely places on the free pan of the balance weights approximating the negative weight difference, for instance with an approximation of not more than 10 grams. In this manner, the determination of the weight is automatic within the precision degree allowed by the apparatus, for instance one centigram;

(c) Determine the quantity of moisture and volatile substances at fixed temperature. To perform these operations, the balance is fitted with a circular pan mounted above the beam. An infrared lamp heats a fixed-weight sample of the substance to be dried, and automatically the chain unwinds to compensate for the weight lost by the substance in drying out. It should be noted that the distance between the lamp and the substance to be dried remains constant throughout the operation because, as a result of the automatic feature, the balance beam remains substantially horizontal.

(d) Determine the weight gained by a substance over a given period of time by means of a timer which is zeroed at each operation and stops after a predetermined time— the signal being indicated by optical or acoustical means— stopping at the same time all automatic mechanisms of the device. This operation makes it possible to determine the absolute moisture in a given space in relation to the quantity of water absorbed by a certain product (for instance, calcium chloride), or to determine the contents, in a given space, of a gas absorbable by a certain substance (for instance, carbon dioxide over soda lime).

(e) By a simple attachment to the device according to the invention, it is also possible, in addition to determining the absolute value of weight increases and decreases, to obtain diagrams or charts of said increases and decreases. To this end, it will be sufficient to provide a paper-covered cylindrical drum revolving at a fixed rate, the ordinates consisting of sections proportional to the excursions of the chain. It is evident that a study of such diagrams, on the basis of tables previously plotted, will yield valuable information on the characteristics of the substance observed.

(f) The balance covered by the present invention is particularly useful in normal weighing operations with crucibles, cartridges, filter holders, etc., after calcination, evaporation or other process. Having balanced off the weight of the container by an appropriate tare weight, reference can always be made to the initial weight of the substance to be treated, and when the latter is of a specific weight, in relation to the indications of the meter, the percentage values of weight gains and losses will be obtained directly.

The description of the invention will be more easily understood by having reference to the enclosed drawings which represent, as a non-limiting example, a normal laboratory balance fitted with the device for automatic operation according to the invention. Instead of modifying a balance of known type, of course, a new balance can be built, embodying the characteristic parts of the automatic-weighing device.

In the table:

Fig. 1 is a perspective view of the apparatus; and

Figs. 2 and 3 are respectively details of the device to chart weight variations and of the friction roller.

Fig. 4 is a circuit diagram showing the electric operating circuit.

With reference to the figures, the balance is contained in a rectangular casing 1 resting on adjustable feet 2, whereby the stand 3 can be positioned vertically with the help of plumb wire 4. As in every balance, there is provided a fixed beam 5 and a beam 6 with equal arms, suspended on blades and swinging in respect to the former. To relieve the weight from the blade suspension, a conventional rack device is provided, actuated by knob 7, whereby the balance can be set in operating position or at rest with lifted blade suspension. At the extreme end of the swinging balance beam are suspended, in the usual manner, pans 8 and 8', supported by appropriate rods 9. Thus far, the balance presents no difference from the conventional laboratory balances of the same type.

For the application of the automatic-weighing device, the casing 1 is fitted on its upper face with a box 1' divided into two compartments by divider 11 that constitutes the end wall of the right hand compartment. In the left-hand compartment is fitted a circular pan 12 supported by a knee piece 13 fastened to the supports 9 of balance pan 8. This pan is surmounted by an infrared lamp 15 supported by a standard 16 and arm 17. A collar and wing screw 18, or other similar device, makes it possible to vary the distance between the lamp and the pan. The compartment situated on the right hand side contains the mechanism for the automatic operation of the balance while the left hand side has an opening 12a on the upper surface of casing 1'. The opening 12a on the left hand side allows the pan 12 to move freely vertically through the oscillatory action of the beam 6.

In the right-hand compartment of box 1' are fitted the electro-mechanical devices for the automatic operation of the apparatus. A universal transformer 21 of known type is fastened to the bottom of box 1' and is fitted with a voltage-adjustment panel 22.

A small electric motor 24 is powered by transformer 21 and drives a shaft 25, which is fitted at its end with roller 26 which rests against a disc 27 slidably mounted on shaft 28. A spring 28' is fitted on shaft 28 and pushes disc 27 against roller 26, thus ensuring the transmission of motion; the spring pressure being adjustable by means of a collar 28'' which can be fastened at different points on the shaft 28.

Shaft 28 carries on one end a worm-gear train 29 and, on the other end it actuates, through an appropriate reduction gear 30, a revolution counter 31. Shaft 33 carries a pulley 34, over which is threaded the chain 35. As pulley 34 revolves, the chain is transferred from a pan 37 fastened to box 1 into a pan 38 hanging from the supports of balance pan 8', and vice-versa. Pan 38 is fitted in its center with a cone 38' whose function is to distribute the chain evenly around the base of the cone, preventing it from bunching and altering the length of the free chain action, which length affects the weight resting on pan 38, and hence the precision of weighing operation.

Between fixed beam 5 and swinging beam 6 of the balance are fitted, at the ends of the arms, two platinum-point contacts 40 and 40' which, when the beam 6 is locked in rest position by means of knob 7, are both closed. But since in the initial part of its beam-lowering travel the knob 7 cuts the circuit, no current will pass. When knob 7 raises the swinging arm, both contacts will be open, and with one of the poles under current, as long as the beam remains horizontal, i.e. as long as the two pans are balanced, but if either pan drops, the contact on the same side will close, and the motor will receive current and drive pulley 34 in the direction to transfer chain from pan 37 to pan 38 if balance pan 8 is more loaded than the other, and in the opposite direction if the other pan bears more load. It is evident that the motor will stop only when the swinging beam will be stopped in balanced position. The operator will then read the indication of revolution counter 31, and since this will be proportional to the diameter of pulley 34, to the weight of the chain per unit of length and to the ratio between the revolutions of shafts 33 and 30, which drive respectively the pulley 34 and the revolution counter, the number of revolutions shown by the dial of the counter will be equal to the number of weight units, for instance centigrams.

The friction device 26—27 also helps in adjusting the device to make the number of revolutions coincide with the number of weight units, because by appropriately shifting roller 26 the radius of contact with the disc is varied, varying accordingly also the ratio between the motor revolutions and the revolutions of the other components of the mechanism described above. The roller 26 is moved only when adjustment of the device is effected. During the operation of the device, the roller remains in a fixed position.

Provision is made for the case in which the automatic device does not stop correctly when the pointer 41 is opposite the center of the scale 42 at the lower end of standard 3. This can happen because between the position of the swinging beam in which the contact is closed at 40, and the position in which the contact is closed at 40', there are necessarily intermediate positions. In this case, by means of knob 43 fitted to shaft 28, the position is corrected until the pointer is centered, and this is the only manual operation that has to be performed with the device described.

Another knob 44 is provided to zero the revolution motion, while a button 45 boosts the power of the drive motor for quickly shifting the chain from one pan to the other. The control panel is also fitted with a cut-off switch 46 and an indicator light 47.

To prevent the chain from falling loose when passing from one pan to the other, the chain ends are fitted with two balls 35a and 35b which cannot pass through the eyes of two arms 48 and 48', the former of which, when pulled up by the ball, rises and cuts off the current. Any suitable means (not shown) may be used to facilitate this movement of the switch arm 48. The chain is maintained in the groove of pulley 34 by one or more guide rollers 49, which prevent the chain from sliding or falling off.

The device operates in the following manner. Let us assume that we must determine the quantity of moisture lost by the sample of a given substance under infrared lamp heating over ten minutes. A fixed quantity of the substance is placed in pan 12, balancing it with a corresponding weight in pan 8'. The revolution counter is zeroed, timer 50 is adjusted to ten minutes, then current is switched on, and lamp 15 is lighted.

The moisture loss caused by the heat produced by the lamp lightens pan 8 and closes contact 40', driving the motor in the direction to transfer from pan 38 to pan 37 a certain quantity of chain, which is recorded by the counter in weight units. This transfer of chain lasts throughout the period in which the sample loses weight; on expiration of the ten minutes, the timer 50 cuts off both the motor and the lamp. The weight loss can then be read directly on the counter and, when a standard sample weight has been established, the counter will indicate directly the weight percentage referred to the initial weight of the sample.

The recording device is outlined in Fig. 2, where a revolving drum 52, around which a sheet of paper is wound, is fastened to shaft 53, which is driven from timer 50. Through an appropriate connection with shaft 33 which actuates pulley 34, pinion 54 is driven, which meshes with a rack 55, at the end of which is fastened a writing point 56 which traces a diagram on the paper wound around drum 52.

The balance comprising the device described above can also be used in the conventional manner, by cutting off the electrical circuit.

A greater weighing precision can be achieved with the balance according to the present invention by providing two chains instead of a single one each of which chains is mounted on a proper pulley and said pulley having a diameter slightly different one with respect to the other and revolving in opposite directions at the same r.p.m. speed ratio.

Thus for a certain quantity of chain loaded in the balance pan a slightly different quantity is taken off from the same pan, whereby a greater weighing precision is obtained.

The same result can be achieved by mounting the two chains in two pulleys having the same diameter but revolving at a slightly different r.p.m. speed ratio.

What I claim is:

1. A weight compensating device for use with a balance having a swingable beam, a rod carried by one end of said beam, another rod carried by the other end of said beam, a pan carried by the first-mentioned rod, and another pan carried by said other rod, and a casing for said balance, said device comprising current-carrying contacts adjacent the ends of the beam, an electric motor, a pulley located substantially above said other pan, means operatively connecting said motor with said pulley, means operatively connecting said motor with said contacts to energize said motor and rotate it along with said pulley in one direction when one end of said beam engages one of said contacts, and to rotate the motor and the pulley in the opposite direction when the other end of said beam engages the other contact, a chain carried by said pulley and actuated thereby, a third pan carried by said other rod substantially above said other pan, an arm having an eyelet and carried by said other rod, said arm being located between said pulley and said third pan, a fourth pan carried by said casing, a second arm having an eyelet and located above said fourth pan, said chain extending through said eyelets, balls carried by opposite ends of said chain, said balls being larger in size than said eyelets, and means operatively connecting said second arm with the second-mentioned means to switch off the motor when the eyelet of the second arm is engaged by the ball at one end of the chain.

2. A weight compensating and indicating device for use with a balance having a swingable beam, a rod carried by one end of said beam, another rod carried by the other end of said beam, a pan carried by the first-mentioned rod, and another pan carried by said other rod, and a casing for said balance, said device comprising current-carrying contacts adjacent the ends of the beam, an electric motor, a pulley located substantially above said other pan, a shaft driven by said motor, a roller carried by said shaft, another shaft, a disc carried by said other shaft and engaged by said roller for actuating said other shaft, a revolution counter, means operatively connecting said other shaft with said pulley and said revolution counter, means operatively connecting said motor with said contacts to energize said motor and rotate it along with said pulley in one direction when one end of said beam engages one of said contacts, and to rotate the motor and the pulley in the opposite direction when the other end of said beam engages the other contact, a chain carried by said pulley and actuated thereby, a third pan carried by said other rod substantially above said other pan, an arm having an eyelet and carried by said other rod, said arm being located between said pulley and said third pan, a fourth pan carried by said casing, a second arm having an eyelet and located above said fourth pan, said chain extending through said eyelets, balls carried by opposite ends of said chain, said balls being larger in size than said eyelets, and means operatively connecting said second arm with the second-mentioned means to switch off the motor when the eyelet of the second arm is engaged by the ball at one end of the chain.

References Cited in the file of this patent

UNITED STATES PATENTS

| | | |
|---|---|---|
| 1,295,258 | Becker | Feb. 25, 1919 |
| 1,484,358 | Norton | Feb. 19, 1924 |
| 1,490,270 | Hebden | Apr. 15, 1924 |
| 1,851,703 | Hamilton | Mar. 29, 1932 |
| 1,964,349 | Gattoni | June 26, 1934 |
| 2,096,995 | Mizell | Oct. 26, 1937 |
| 2,622,438 | Campbell | Dec. 23, 1952 |
| 2,656,177 | Liddell | Oct. 20, 1953 |
| 2,709,076 | Hansen | May 24, 1955 |
| 2,739,803 | Carton | Mar. 27, 1956 |

FOREIGN PATENTS

| | | |
|---|---|---|
| 332,457 | Italy | Nov. 29, 1935 |
| 816,908 | France | Aug. 20, 1937 |
| 683,925 | Great Britain | Dec. 10, 1952 |